(12) United States Patent
Sata et al.

(10) Patent No.: US 10,657,737 B2
(45) Date of Patent: May 19, 2020

(54) VEHICLE ERROR IDENTIFICATION SYSTEM

(71) Applicant: Toyota Motor Engineering & Manufacturing North America, Inc., Erlanger, KY (US)

(72) Inventors: Andrew G. Sata, Irvine, CA (US); Daniel Folick, Long Beach, CA (US); Jared Farnsworth, Gardena, CA (US); Tomoo Yoshizumi, Rancho Palos Verdes, CA (US)

(73) Assignee: TOYOTA MOTOR ENGINEERING & MANUFACTURING NORTH AMERICA, INC., Plano, TX (US)

( * ) Notice: Subject to any disclaimer, the term of this patent is extended or adjusted under 35 U.S.C. 154(b) by 228 days.

(21) Appl. No.: 15/791,018

(22) Filed: Oct. 23, 2017

(65) Prior Publication Data

US 2019/0122456 A1     Apr. 25, 2019

(51) Int. Cl.
*G07C 5/08* (2006.01)
*G01M 17/007* (2006.01)
*B60W 40/10* (2012.01)

(52) U.S. Cl.
CPC ........... *G07C 5/0808* (2013.01); *B60W 40/10* (2013.01); *G01M 17/007* (2013.01); *G07C 5/085* (2013.01); *G07C 5/0825* (2013.01); *G07C 5/0841* (2013.01); *G07C 2205/02* (2013.01)

(58) Field of Classification Search
CPC ..... G07C 5/0808; G07C 5/0825; G07C 5/085
See application file for complete search history.

(56) References Cited

U.S. PATENT DOCUMENTS

| 4,671,111 A * | 6/1987 | Lemelson | G01M 17/007 340/439 |
| 6,694,806 B2 * | 2/2004 | Kumagai | F02D 41/2422 73/114.52 |
| 7,096,082 B1 | 8/2006 | Connelly | |
| 7,218,974 B2 | 5/2007 | Rumi et al. | |

(Continued)

FOREIGN PATENT DOCUMENTS

KR     2014070389     6/2014

*Primary Examiner* — Jerrah Edwards
(74) *Attorney, Agent, or Firm* — Snell & Wilmer LLP

(57) ABSTRACT

A system includes an input device that receives desirable performance characteristics of a vehicle a diagnostic processor that receives vehicle test data, and determines undesirable vehicle performance data points by comparing the desirable vehicle performance characteristics to the test data. The diagnostic processor also determines undesirable system data points that correspond to likely causes of the undesirable vehicle performance data points by comparing the desirable system performance characteristics to the test data, and determines undesirable component data points that correspond to likely causes of the undesirable system data points by comparing the desirable component performance characteristics to the test data. The diagnostic processor also generates an analysis of the undesirable component data points including selected component data points of the undesirable component data points that are likely causes of the undesirable vehicle performance data points, and controls an output device to output the analysis of the undesirable component data points.

17 Claims, 13 Drawing Sheets

(56) References Cited

U.S. PATENT DOCUMENTS

| | | | |
|---|---|---|---|
| 7,498,590 B2 | 2/2009 | Avergun et al. | |
| 8,306,783 B2 * | 11/2012 | Duc | G05B 23/0251 |
| | | | 702/185 |
| 8,352,486 B1 | 1/2013 | McGrory et al. | |
| 9,031,990 B2 | 5/2015 | Scott et al. | |
| 9,129,231 B2 | 9/2015 | Kaufman et al. | |
| 2002/0056314 A1 * | 5/2002 | Kumagai | F02D 41/2422 |
| | | | 73/114.55 |
| 2002/0120490 A1 | 8/2002 | Gajewski et al. | |
| 2008/0319812 A1 | 12/2008 | Sousa et al. | |
| 2009/0287427 A1 | 11/2009 | Dubois et al. | |
| 2010/0017167 A1 * | 1/2010 | Duc | G05B 23/0251 |
| | | | 702/185 |
| 2010/0030601 A1 | 2/2010 | Warther et al. | |
| 2010/0209892 A1 * | 8/2010 | Lin | G09B 9/05 |
| | | | 434/71 |
| 2010/0249975 A1 | 9/2010 | Rezayat | |
| 2014/0358926 A1 | 12/2014 | McGregor et al. | |
| 2017/0124785 A1 | 5/2017 | Rozak et al. | |

\* cited by examiner

VEHICLE ERROR IDENTIFICATION SYSTEM

BACKGROUND

1. Field

The present disclosure relates to systems and methods for identifying undesirable behavior in a vehicle or a model of a vehicle based on detected test data during a test run of the vehicle or the model and for identifying a root cause of the undesirable behavior.

2. Description of the Related Art

Vehicles may exhibit undesirable behavior during various phases of design, testing and use. A model of a vehicle may be created and tested to identify undesirable behavior before manufacture of a design prototype. Similarly, a prototype of a vehicle may be subjected to tests in a laboratory using a dynamometer (or on a roadway) to identify undesirable behavior after the initial design of the vehicle is completed. Additionally, a vehicle that is available in the marketplace may exhibit undesirable behavior after purchase by a consumer.

Regardless of the design, testing or use phase during which the undesirable behavior is discovered, it is desirable to optimize the component or control causing the undesirable behavior. In order to optimize the component or control, the component or control that is the root cause of the undesirable behavior (or that provides an opportunity for optimization) should first be identified. Design engineers may spend hours upon hours examining the vehicle to determine a root cause of the undesirable vehicle behavior or optimization opportunities. Upon identifying a root cause of the undesirable vehicle behavior, the design engineers may then replace the root cause component or develop a new design for the component that corrects the undesirable vehicle behavior. Determining optimization opportunities may be very difficult or even impossible and very time consuming, as these opportunities may be discovered using trial and error.

Accordingly, there is a need in the art for systems and methods for optimizing components and control of various aspects of vehicles.

SUMMARY

Described herein is a diagnostic system for diagnosing a vehicle or a vehicle model. The system includes an input device designed to receive user input including desirable vehicle performance characteristics of the vehicle, desirable system performance characteristics of systems of the vehicle, and desirable component performance characteristics corresponding to components of the systems. The diagnostic system further includes an output device designed to output data. The diagnostic system further includes a diagnostic processor coupled to the input device and the output device. The diagnostic processor is designed to receive test data corresponding to a simulation of the vehicle or a performance test of the vehicle and including detected vehicle data, detected system data, and detected component data. The diagnostic processor is further designed to determine undesirable vehicle performance data points by comparing the desirable vehicle performance characteristics to the detected vehicle data. The diagnostic processor is further designed to determine undesirable system data points that correspond to likely causes of the undesirable vehicle performance data points by comparing the desirable system performance characteristics to the detected system data. The diagnostic processor is further designed to determine undesirable component data points that correspond to likely causes of the undesirable system data points by comparing the desirable component performance characteristics to the detected component data. The diagnostic processor is further designed to generate an analysis of the undesirable component data points including selected component data points of the undesirable component data points that are likely causes of the undesirable vehicle performance data points. The diagnostic processor is further designed to control the output device to output the analysis of the undesirable component data points.

Also described is a diagnostic system for diagnosing a vehicle or a vehicle model. The diagnostic system includes an input device designed to receive user input including desirable vehicle performance characteristics of the vehicle, desirable system performance characteristics of systems of the vehicle, and desirable component performance characteristics corresponding to components of the systems. The diagnostic system further includes a display designed to output data. The diagnostic system further includes a diagnostic processor coupled to the input device and the display. The diagnostic processor is designed to receive test data corresponding to a simulation of the vehicle or a performance test of the vehicle and including detected vehicle data, detected system data, and detected component data. The diagnostic processor is further designed to determine undesirable vehicle performance data points by comparing the desirable vehicle performance characteristics to the detected vehicle data. The diagnostic processor is further designed to determine undesirable system data points that correspond to likely causes of the undesirable vehicle performance data points by comparing the desirable system performance characteristics to the detected system data. The diagnostic processor is further designed to determine undesirable component data points that correspond to likely causes of the undesirable system data points by comparing the desirable component performance characteristics to the detected component data. The diagnostic processor is further designed to generate an analysis of the undesirable component data points including selected component data points of the undesirable component data points that are likely causes of the undesirable vehicle performance data points. The diagnostic processor is further designed to control the display to output the analysis of the undesirable component data points.

Also described is a method for diagnosing a vehicle or a vehicle model. The method includes receiving, via an input device, user input including desirable vehicle performance characteristics of the vehicle, desirable system performance characteristics of systems of the vehicle, and desirable component performance characteristics corresponding to components of the systems. The method further includes receiving, by a diagnostic processor, test data corresponding to a simulation of the vehicle or a performance test of the vehicle and including detected vehicle data, detected system data, and detected component data. The method further includes determining, by the diagnostic processor, undesirable vehicle performance data points by comparing the desirable vehicle performance characteristics to the detected vehicle data. The method further includes determining, by the diagnostic processor, undesirable system data points that correspond to likely causes of the undesirable vehicle performance data points by comparing the desirable system performance characteristics to the detected system data. The method further includes determining, by the diagnostic processor, undesirable component data points that correspond to likely causes of the undesirable system data points by comparing the desirable component performance characteristics to the detected component data. The method further includes generating, by the diagnostic processor, an analysis of the undesirable component data points including selected component data points of the undesirable component data points that are likely causes of the undesirable vehicle performance data points. The method further includes controlling, by the diagnostic processor, an output device to output the analysis of the undesirable component data points.

BRIEF DESCRIPTION OF THE DRAWINGS

Other systems, methods, features, and advantages of the present invention will be or will become apparent to one of ordinary skill in the art upon examination of the following figures and detailed description. It is intended that all such additional systems, methods, features, and advantages be included within this description, be within the scope of the present invention, and be protected by the accompanying claims. Component parts shown in the drawings are not necessarily to scale, and may be exaggerated to better illustrate the important features of the present invention. In the drawings, like reference numerals designate like parts throughout the different views, wherein:

DETAILED DESCRIPTION

The present disclosure describes systems and methods for diagnosing undesirable performance of a vehicle or a model of a vehicle. The systems provide multiple benefits and advantages such as providing an automated diagnosis of the vehicle based on desirable performance characteristics and detected test data. Rather than simply providing error codes which must be interpreted, the systems advantageously identify a root cause of the undesirable behavior. The systems beneficially identify undesirable performance of not only the vehicle, but also systems of the vehicle and components of the various systems that may be root causes of the undesirable vehicle behavior. The systems may further identify and remove unlikely root causes corresponding to undesirable performance that is caused by operator error or control error, beneficially saving an analyst time when reviewing the diagnosis. The systems also advantageously rank the undesirable results by order of most likely root cause of the undesirable vehicle performance, providing additional time savings. The systems further advantageously provide the diagnosis in graph format, providing an easily-interpreted analysis of the diagnosis.

An exemplary system may include an input device that can receive desirable performance characteristics of a vehicle, of systems of the vehicle, and of components of the systems. The input device may further receive test data corresponding to results of experimentation using the vehicle. The system may further include a diagnostic processor that can receive the desirable performance characteristics and the test data. The diagnostic processor compares the desirable performance characteristics and the test data for the vehicle as well as the multiple systems and components thereof. The diagnostic processor identifies undesirable vehicle, system, and component performance based on the comparison and generates an analysis of the vehicle, system, and component performance. The system may further include an output device that outputs the analysis generated by the diagnostic processor.

Figure 1:
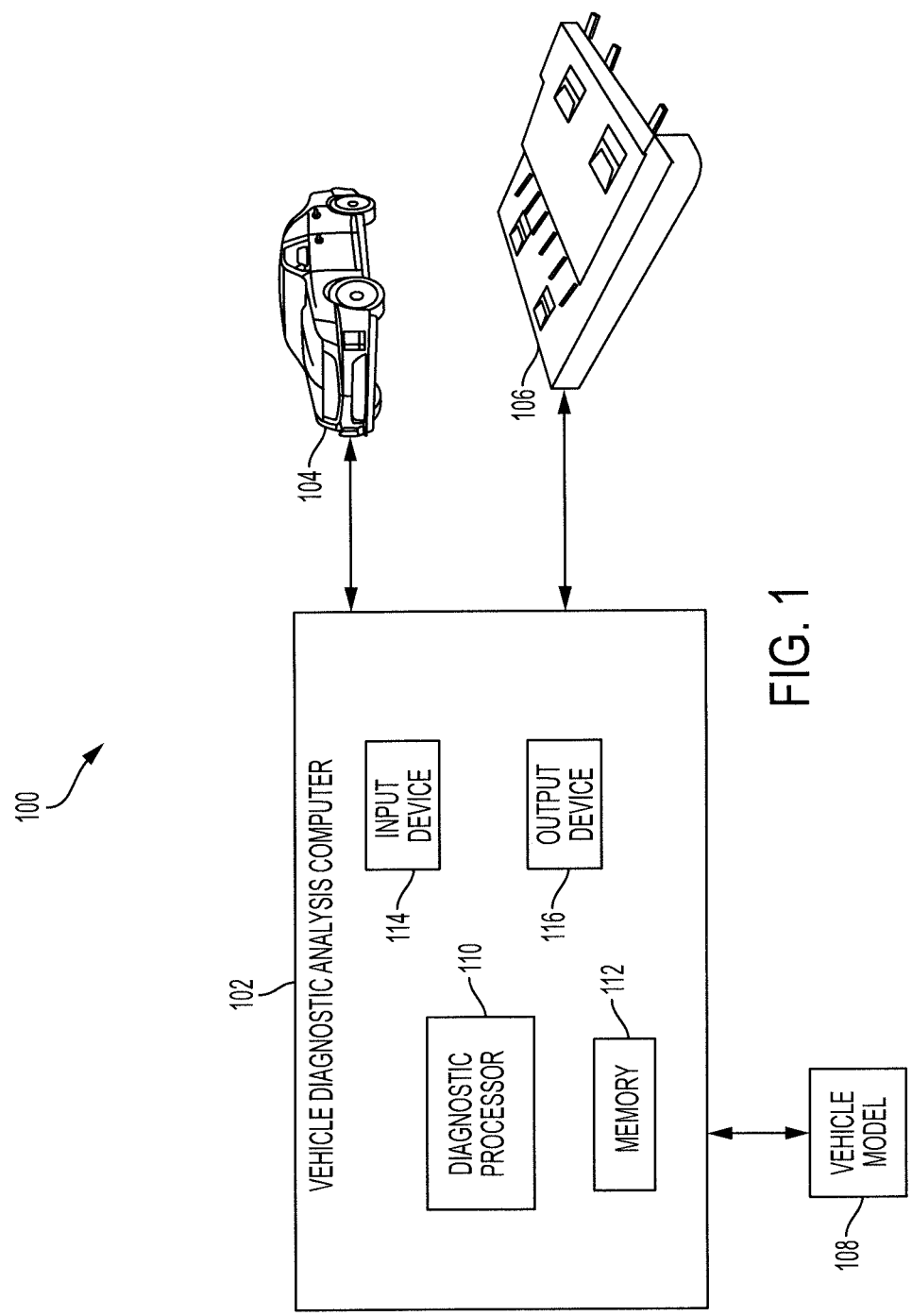
FIG. 1 is a block diagram illustrating a diagnostic system for diagnosing undesirable behavior in a vehicle or a model of a vehicle according to an embodiment of the present invention.

Turning to FIG. 1, a diagnostic system 100 includes various components for diagnosing (or identifying errors corresponding to) a vehicle 104 or a model 108 of a vehicle. The diagnostic system 100 may include a vehicle diagnostic analysis computer 102. The vehicle diagnostic analysis computer 102 may be specifically designed to perform diagnostics related to the vehicle 104 or the model 108. The system 100 may further include a dynamometer 106.

The vehicle 104 may include various sensors for detecting test data corresponding to operation of the vehicle 104. The test data may include vehicle performance data corresponding to performance of the vehicle 104 as a whole (such as an acceleration rate of the vehicle under various conditions). The test data may further include system performance data corresponding to performance of a system of the vehicle (such as a power output of a motor of the vehicle 104). The test data may further include component performance data corresponding to performance of a component of the system (such as a state of charge (SOC) or a temperature of a battery of the vehicle 104).

In some embodiments, the test data may be detected while the vehicle 104 is driven along a stretch of roadway or other terrain. In some embodiments, the vehicle may be operating on the dynamometer 106. Accordingly, the dynamometer 106 may include sensors capable of detecting similar test data as the sensors of the vehicle 104. The test data from the vehicle 104 or from the dynamometer 106 may be provided to the vehicle diagnostic analysis computer 102 for analysis. The vehicle diagnostic analysis computer 102 may identify specific data points within the test data that indicate undesirable performance of the vehicle, of the systems, and of the components. A data point may correspond to a single piece of test data.

In some embodiments, test data may be generated from the vehicle model 108. In some embodiments, the vehicle model 108 may be simulated on the vehicle diagnostic analysis computer 102 and, in some embodiments, the vehicle model 108 may be simulated on a separate simulation computer or device. The vehicle model 108 may simulate results of operation of the vehicle 104.

The vehicle diagnostic analysis computer 102 may include a diagnostic processor 110, a memory 112, an input device 114, and an output device 116.

The diagnostic processor 110 may include one or more processors or controllers and be capable of implementing logic. The diagnostic processor 110 may include a general purpose processor, a digital signal processor (DSP), an application specific integrated circuit (ASIC), a field programmable gate array (FPGA) or other programmable logic device, discrete gate or transistor logic, discrete hardware components, or any combination thereof.

The memory 112 may include any non-transitory memory capable of storing instructions to be performed by the diagnostic processor 110, along with any additional data (such as upon request the diagnostic processor 110).

The input device 114 may include any one or more input devices. For example, the input device 114 may include a keyboard, a mouse, a microphone, or the like. In some embodiments, the input device 114 may include a port or other communication feature (such as a USB port, a disk drive, an Ethernet port, a Bluetooth port, a Wi-Fi port, or the like) capable of transmitting or receiving data from the vehicle 104, the dynamometer 106, a model computer running the vehicle model 108, or the like.

The input device 114 may receive various data including the test data from at least one of the vehicle 104, the dynamometer 106, or the vehicle model 108. The input device 114 may further receive desirable characteristics corresponding to the vehicle 104. The desirable characteristics may include desirable vehicle performance characteristics (such as desirable acceleration rates). The desirable vehicle performance characteristics may correspond to desirable or target operation of the vehicle 104 in certain vehicle states and in response to certain inputs to the vehicle (such as accelerator pedal position, road grade, or the like). The desirable characteristics may further include desirable system performance characteristics (such as a power output by a motor). The desirable system performance characteristics may correspond to desirable or target operation of a system of the vehicle 104 in certain states and in response to certain inputs (such as a road grade or a speed of the vehicle 104). The desirable characteristics may further include desirable component performance characteristics (such as a state of charge or temperature of a battery of the vehicle 104). The desirable component performance characteristics may correspond to desirable or target operation of a component of the system in certain states and in response to certain inputs (such as a battery state of charge or a battery temperature).

In some embodiments, the desirable characteristics may be determined or provided by an individual engineer or group of engineers that performed one or more design function related to the vehicle 104. For example, the design engineers of the vehicle 104 may identify the desirable characteristics, convert the desirable characteristics to an electronic format (such as a spreadsheet format), and provide the desirable characteristics to the vehicle diagnostic analysis computer 102 via the input device 114. In some embodiments, the desirable characteristics may be determined or provided by the diagnostic processor 110 and/or the memory 112 based on one or more parameters input by an individual engineer or group of engineers that performed one or more design function related to the vehicle 104.

The diagnostic processor 110 may receive the desirable characteristics and the test data via the input device 114. The diagnostic processor 110 may analyze the test data in view of the desirable characteristics and identify potential causes of undesirable vehicle performance. The diagnostic processor 110 may further generate an analysis of the test data.

The output device 116 may include any one or more device capable of outputting data. For example, the output device 116 may include a touchscreen, a display, a printer, or the like. The diagnostic processor 110 may transmit the analysis of the test data to the output device 116 and may control the output device 116 to output the analysis.

Figure 2:
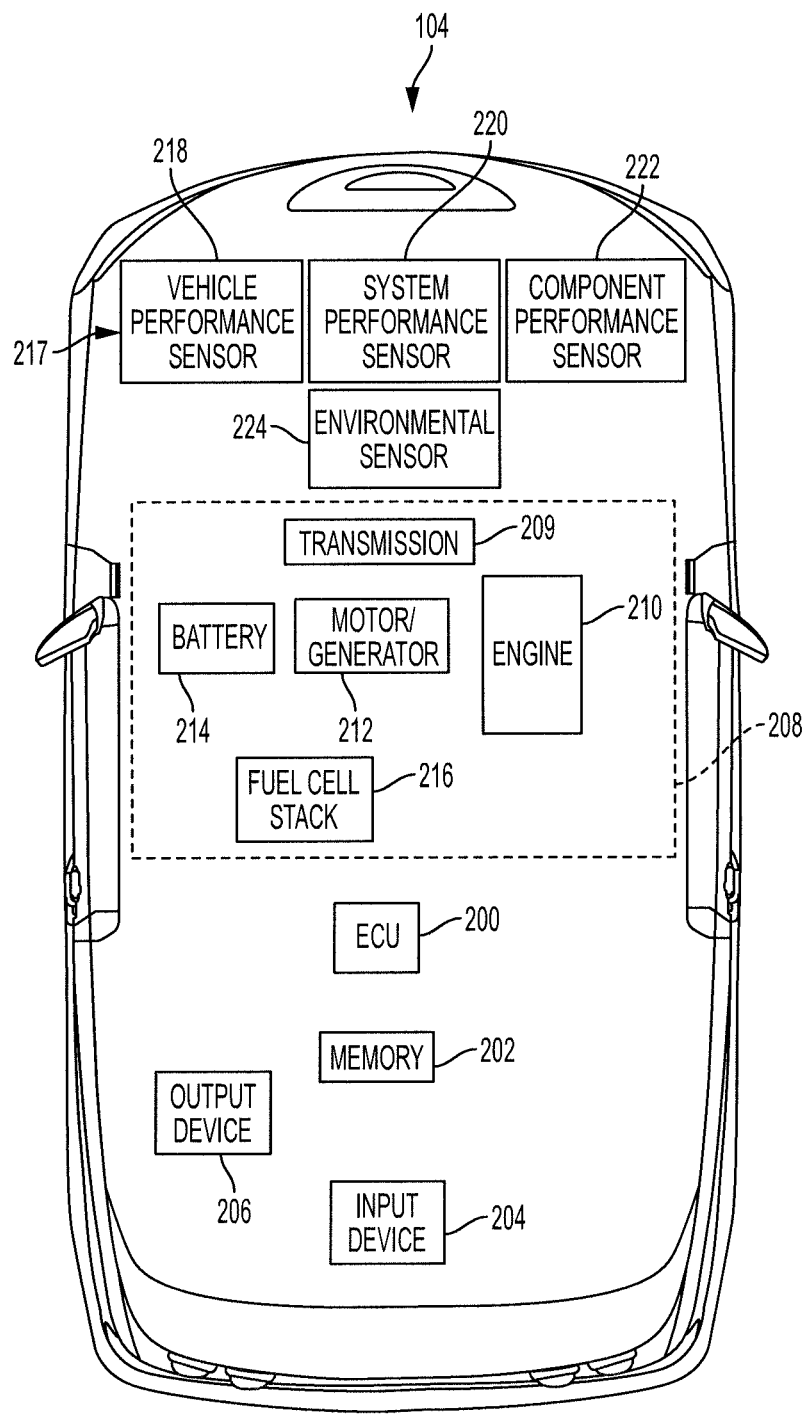
FIG. 2 is a block diagram illustrating various components of a vehicle including sensors for detecting test data usable to diagnose undesirable vehicle behavior according to an embodiment of the present invention.

Referring now to FIG. 2, an embodiment of the vehicle 104 is illustrated. The vehicle 104 may include an ECU 200, a memory 202, an input device 204, and an output device 206. The vehicle 104 may further include a power source 208 and a plurality of sensors 217.

The ECU 200 may be coupled to each of the components of the vehicle 104 and may include one or more processors or controllers, which may be specifically designed for automotive systems. The functions of the ECU 200 may be implemented in a single ECU or in multiple ECUs. The ECU 200 may receive data from components of the vehicle 100, may make determinations based on the received data, and may control the operation of components based on the determinations.

In some embodiments, the vehicle 104 may be fully autonomous or semi-autonomous. In that regard, the ECU 200 may control various aspects of the vehicle 104 (such as steering, braking, accelerating, or the like) to maneuver the vehicle 104 from a starting location to a destination.

The memory 202 may include any non-transitory memory known in the art. In that regard, the memory 202 may store machine-readable instructions usable by the ECU 200 and may store other data as requested by the ECU 200.

The input device 204 may include any one or more input devices such as a touchscreen, a microphone, or the like. The input device 204 may further include components for controlling operation of the vehicle 104. For example, the input device 204 may include an accelerator pedal, a brake pedal, a gear shifter, a cruise control request, a touchscreen, or the like. In that regard, an operator may utilize the input device 204 to control the vehicle 104 in various situations to generate test data.

The output device 206 may include any output device capable of outputting data to an operator of the vehicle or to the vehicle diagnostic analysis computer 102 of FIG. 1. For example, the output device 206 may include a touchscreen, a display, a speaker, or a port capable of communicating with other devices via a wired or wireless connection. For example, the output device 206 may include a Bluetooth port, a Wi-Fi port, an Ethernet port, a USB port, or the like.

The power source 208 may include one or more device capable of generating power to propel the vehicle 104. For example, the power source 208 may include an engine 210 that converts a fuel into mechanical energy. The power source 208 may also include a motor generator 212. The motor generator 212 may receive electricity and may convert the electricity into mechanical energy. The power source 208 may further include a battery 214 configured to store electrical energy usable by the motor generator 212. In some embodiments, the motor generator 212 may also convert mechanical power from the wheels of the vehicle 104 or from the engine 210 into electrical energy to be stored by the battery 214. The power source 208 may further include a fuel cell stack 216. The fuel cell stack 216 may include a plurality of fuel cells that each convert hydrogen or another material into electricity. The electricity generated by the fuel cell stack 216 may be utilized by the motor generator 212 or may be stored in the battery 214.

The power source 208 may further include a transmission 209. The transmission 209 may receive mechanical power from one or both of the engine 210 or the motor generator 212 and may transfer the power to wheels of the vehicle 104. The transmission 209 may further include gears for converting mechanical power having a first angular velocity and torque into mechanical power having a second angular velocity and torque.

The sensors 217 may include one or more vehicle performance sensors 218, one or more system performance sensors 220, one or more component performance sensors 222, and one or more environmental sensors 224.

The vehicle performance sensor 218 may detect vehicle data corresponding to performance of the vehicle 104. For example, the vehicle performance sensor 218 may detect an acceleration rate of the vehicle 104, may detect a speed of the vehicle 104, or the like.

The system performance sensor 220 may detect system data corresponding to performance of a system of the vehicle 104. For example, the systems may include a motor generator system corresponding to the motor generator 212, an engine system corresponding to the engine 210, or the like. The system performance sensor 220 may detect, for example, a power output of the motor generator 212, a power output by the engine 210, or the like.

The component performance sensor 222 may detect component data corresponding to performance of a component of one or more systems of the vehicle 104. For example, the components may include one or more fuel cells of the fuel cell stack 216, one or more pumps of the fuel cell stack 216, the battery 214, or the like. The component performance sensor 222 may detect, for example, a temperature of one or more fuel cells, a pressure output by one or more pumps of the fuel cell, a state of charge of the battery 214, or the like.

The environmental sensor 224 may detect environmental data corresponding to an environment of the vehicle 104. For example, the environmental sensor 224 may detect a road grade of the current road, a current altitude of the vehicle 104, a current location of the vehicle 104, a current ambient temperature around the vehicle 104, or the like.

The ECU 200 may receive data from the input device 204 such as vehicle control data corresponding to operation of the vehicle 104 (i.e., an amount of depression of an accelerator pedal, a current gear ratio of the transmission 209, or the like). The ECU 200 may further receive the data from the plurality of sensors 217 including test data detected by the performance sensors 218, 220, 222. With brief reference to FIGS. 1 and 2, the ECU 200 may transmit the vehicle control data, the test data, and the environmental data to the vehicle diagnostic analysis computer 102 via the output device 206.

Figure 3:
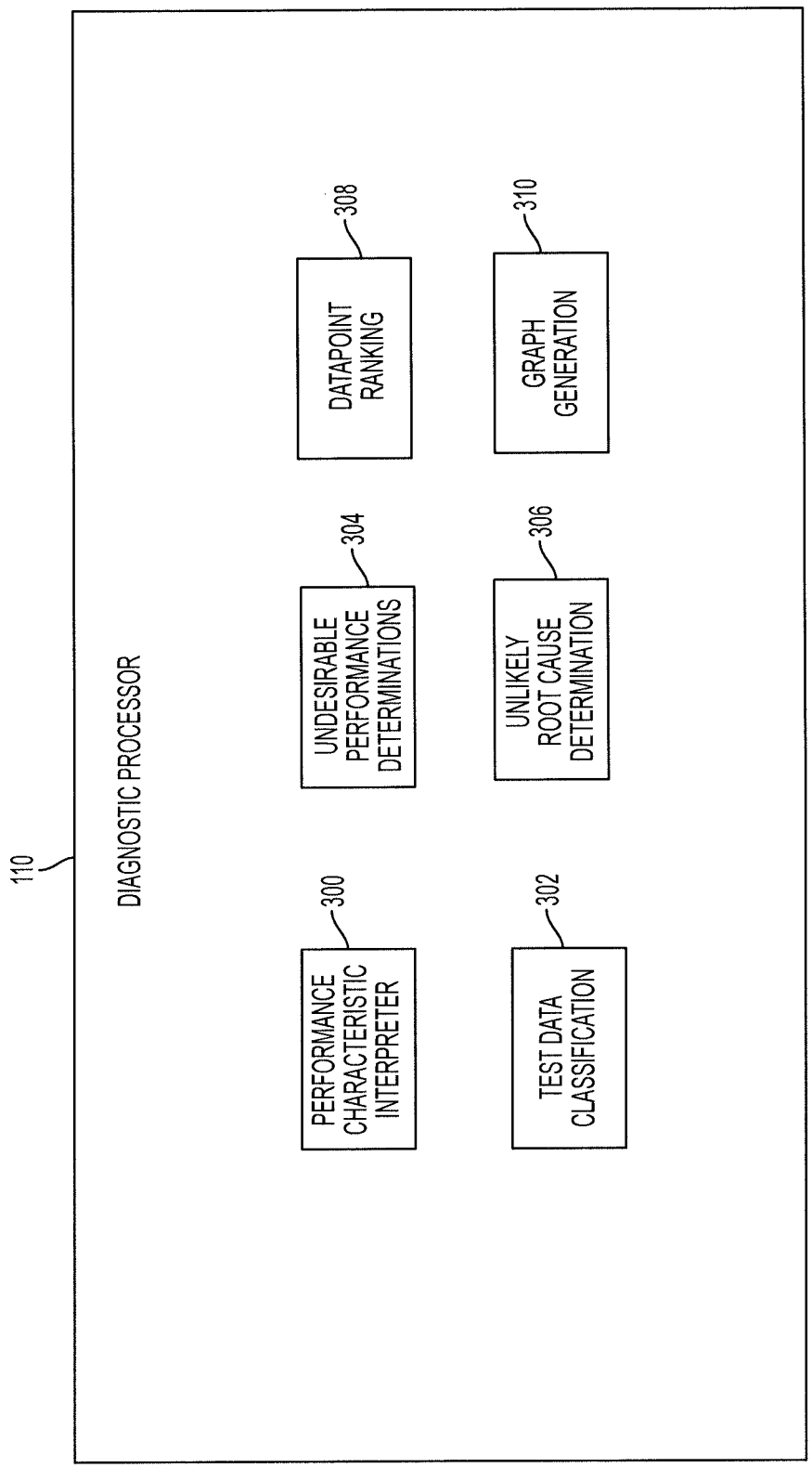
FIG. 3 is a block diagram illustrating various functions of a diagnostic processor of the diagnostic system of FIG. 1 according to an embodiment of the present invention.

Referring now to FIG. 3, the diagnostic processor 110 may be designed to perform various functions. In some embodiments, the diagnostic processor 110 may have specific hardware designated to perform each of the functions such that each function is performed by a dedicated piece of hardware. In particular, the diagnostic processor 110 may include a performance characteristic interpreter function 300, a test data classification function 302, an undesirable performance determinations function 304, an unlikely root cause determination function 306, a data point ranking function 308, and a graph generation function 310.

Referring to FIGS. 1 and 3, the performance characteristic interpreter function 300 may receive the desirable performance characteristics corresponding to the vehicle, the systems, and the components via the input device 114. The performance characteristic interpreter function 300 may convert the desirable performance characteristics into a format usable by the diagnostic processor 110. For example, the performance characteristic interpreter function 300 may convert each of the desirable performance characteristics into one or more graphs having two or more dimensions that visually represent the desirable performance characteristics.

The test data classification function 302 may receive the test data via the input device 114. The test data classification function 302 may then classify the test data according to the specific performance parameter, a specific system, or the specific hardware which the specific test data corresponds to. For example, the test data classification function 302 may determine that acceleration data of the vehicle 104 corresponds to an acceleration performance parameter. The test data classification function 302 may further determine that motor output data corresponds to a motor system of the vehicle 104. The test data classification function 302 may further determine that a battery SOC corresponds to the battery or a specific component within the battery.

The undesirable performance determinations function 304 may compare the test data to the desirable performance characteristics to identify specific data points of the test data that fall outside of the desirable performance characteristics. The undesirable performance determinations function 304 may identify the specific data points that fall outside of the desirable performance characteristics as undesirable performance data points.

For example, a desirable performance characteristic may include that the vehicle 104 should accelerate at 0.35 times the force of gravity (0.35 G) when the vehicle 104 is on a road having a grade of 23 percent (23%) and traveling a speed of 10 miles per hour (10 mph). The tests data may include a data point that the vehicle 104 accelerated at 0.1 G while the vehicle 104 was traveling along a 23% grade at 10 mph. Accordingly, the undesirable performance determinations function 304 may identify that specific data point as an undesirable data point.

The undesirable performance determinations function 304 may further identify undesirable system data points that may have caused an undesirable vehicle data point, and may identify undesirable component data points that may have caused the undesirable system data points. In that regard, the undesirable performance determinations function 304 may first identify an undesirable vehicle data point, may then identify one or more undesirable system data points that may be a cause of the undesirable vehicle data point, and then may identify one or more undesirable component data points that may be a cause of the undesirable system data point.

Undesirable data points can further include data points that identify an opportunity for optimization of the vehicle, system, or component or control thereof. For example, the vehicle may operate such that all data points fall within the desirable performance characteristics. However, some of the data points may be spaced from the desirable performance characteristics by a relatively large distance, indicating that the specific system or component, or control thereof, can be optimized.

For example, desirable performance characteristics may indicate that an air compressor temperature should remain below 100 degrees Celsius (100 degrees C.). The component data points may indicate that the air compressor temperature only reaches, and never exceeds, 79 degrees C. Although no error is detected, the data may indicate that an opportunity exists to optimize the air compressor because of the 21 degree C. distance between the desirable performance characteristics and the data points. In that regard, a designer of the air compressor system may utilize such data to determine that the air compressor may be modified by incorporating a smaller compressor to save weight and cost. Even though the smaller compressor may reach higher temperatures (such as 95 degrees C.), it may be optimal relative to the original compressor due to the reduced weight and cost of the smaller compressor.

The unlikely root cause determination function 306 may identify specific undesirable data points that are unlikely to be the root cause of an undesirable vehicle performance data point. For example, the unlikely root cause determination function 306 may determine whether a specific undesirable vehicle, system, or component data point was caused by operator error or by an incorrectly set target operation (which may indicate a control error instead of a hardware error). The unlikely root cause determination function 306 may then tag or otherwise identify the unlikely root cause data points.

For example, the unlikely root cause determination function 306 may determine that a SOC data point was less than a target SOC data point and is thus an undesirable SOC data point. Because SOC is based on driver operation, the unlikely root cause determination function 306 may determine that the undesirable SOC data point is unlikely to be a root cause of an undesirable vehicle performance data point.

The data point ranking function 308 may rank the undesirable data points based on at least one of severity or likelihood of a specific data point being a root cause of an undesirable vehicle performance data point. For example, the data point ranking function 308 may rank a most severe or most likely undesirable data point relatively high and may rank unlikely root cause data points relatively low. Severity may be determined based on an amplitude and a frequency of the undesirable data point. For example, an undesirable data point that is 20 percent greater than the desirable performance characteristic may be ranked more severely than an undesirable data point that is only 3 percent greater than the desirable performance characteristic.

The graph generation function 310 may generate one or more graph that associates the test data with the desirable performance characteristics. For example, the graph generation function 310 may generate one or more graph for each set of test data and its associated desirable performance characteristics. For example, the graph generation function 310 may generate a graph that includes desirable motor power output for various environmental conditions and may plot the test data corresponding to the detected motor power output on the same graph.

Figure 4:
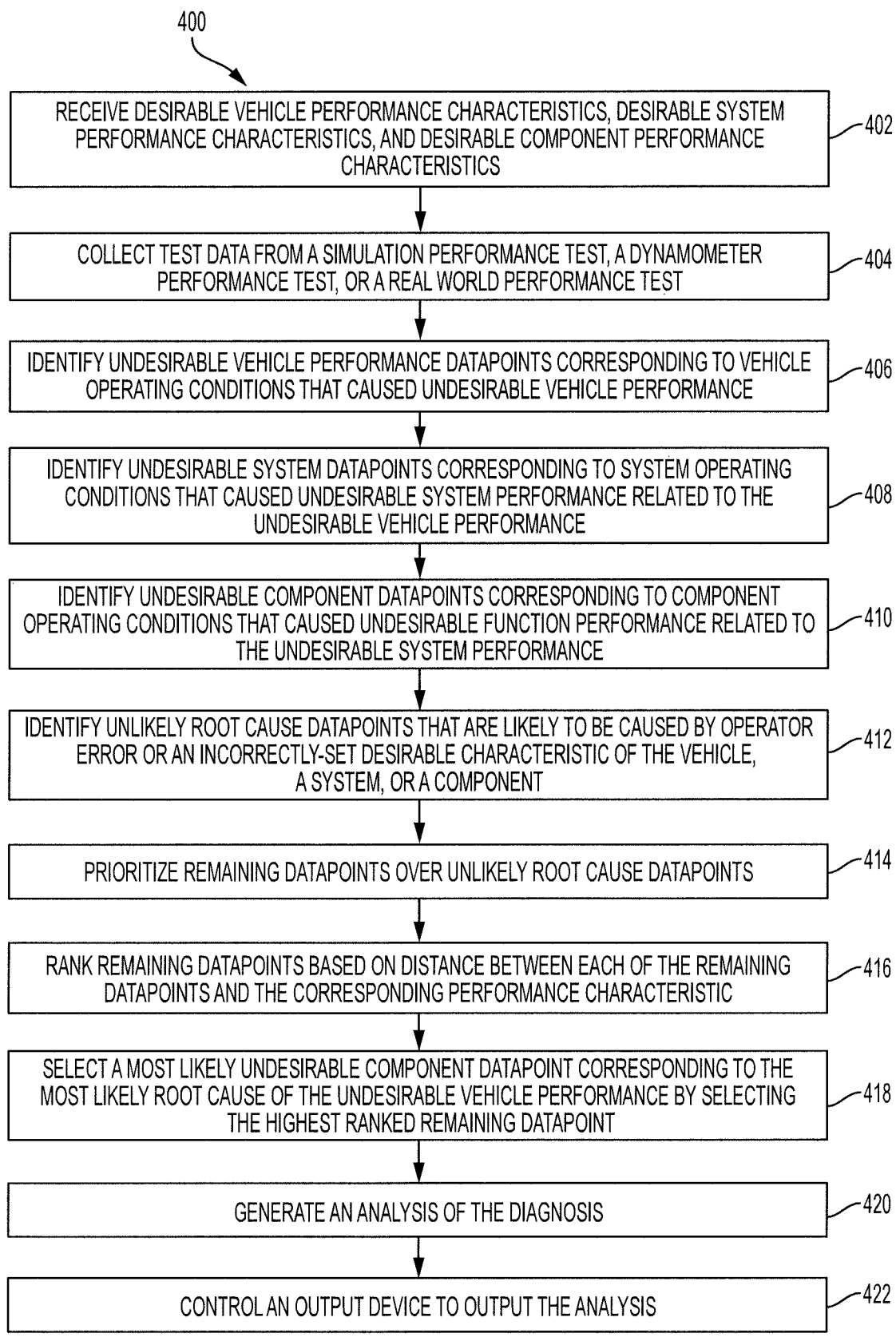
FIG. 4 is a flowchart illustrating a method for diagnosing undesirable behavior in a vehicle or a model of a vehicle using a diagnostic system similar to the diagnostic system of FIG. 1 according to an embodiment of the present invention.

Turning now to FIG. 4, a method 400 for diagnosing a vehicle or a vehicle model is shown. The method 400 may be performed by a system similar to the system 100 of FIG. 1. For example, various blocks of the method 400 may be performed by a diagnostic processor of a vehicle diagnostic analysis computer.

In block 402, the diagnostic processor 110 may receive desirable performance characteristics via an input device. The desirable performance characteristics may include desirable vehicle performance characteristics, desirable system performance characteristics, and desirable component performance characteristics as described above.

In block 404, the test data may be detected or received from a vehicle, a dynamometer, or a simulation using a vehicle model. The test data may include test data corresponding to vehicle performance, system performance, and component performance as described above.

In block 406, the diagnostic processor may identify undesirable vehicle performance data points. As described above, the undesirable vehicle performance data points are data points from the test data that failed to reach or exceed the desirable vehicle performance characteristics. In that regard, the diagnostic processor may identify undesirable vehicle performance data points for each of the desirable vehicle performance characteristics by comparing the vehicle test data to each of the desirable vehicle performance characteristics.

In block 408, the diagnostic processor may identify undesirable system data points. As described above, the undesirable system data points are data points from the test data that fail to reach or exceed the desirable system performance characteristics. In that regard, the diagnostic processor may identify undesirable system performance data points for each desirable system performance characteristics for each system corresponding to the vehicle performance. For example, the diagnostic processor may identify undesirable system data points for a motor power output of a motor. In some embodiments, the diagnostic processor may only identify undesirable system performance data points for systems related to (i.e., which may potentially cause) an undesirable vehicle performance data point.

In block 410, the diagnostic processor may identify undesirable component data points. As described above, the undesirable component data points are data points from the test data that failed to reach or exceed the desirable component performance characteristics. In that regard, the diagnostic processor may identify undesirable component performance data points for each desirable component performance characteristics for each component of each system corresponding to the vehicle performance. For example, the diagnostic processor may identify undesirable component data points for a battery state of charge or a battery temperature of a battery that is used by the motor. In some embodiments, the diagnostic processor may only identify undesirable component performance data points for components related to an undesirable system performance data point.

In block 412, the diagnostic processor may identify unlikely root cause data points. The diagnostic processor may identify unlikely root cause data points for each component and system of the vehicle. As described above, the diagnostic processor may identify undesirable data points that are likely caused by operator error or an incorrectly set target.

In block 414, the diagnostic processor may prioritize the undesirable vehicle, system, and component data points that were not identified as unlikely root cause data points. In some embodiments, the diagnostic processor may eliminate the unlikely root cause data points from a list of undesirable data points.

In block 416, the diagnostic processor may rank the remaining undesirable data points. As described above, the diagnostic processor may rank the remaining undesirable data points based on at least one of severity of the undesirable data point or a likelihood of a specific data point being a root cause of an undesirable vehicle performance data point. In some embodiments, the diagnostic processor may determine the severity or the likelihood of a specific undesirable data point being a root cause of an undesirable vehicle performance data point based on a distance between each undesirable data point and the corresponding performance characteristic. For example, if a first undesirable system data point is only 5% away from a corresponding performance characteristic and a second undesirable system data point is 50% away from the corresponding performance characteristic, then the diagnostic processor may rank the second undesirable system data point higher than the first undesirable system data point.

In block 418, the diagnostic processor may select a most likely undesirable component data point that corresponds to a component data point that is most likely to correspond to the root cause of an undesirable vehicle performance data point. In some embodiments, the diagnostic processor may select the highest ranked undesirable components data point as the most likely undesirable component data point.

In block 420, the diagnostic processor may generate an analysis of the diagnosis of the vehicle. The analysis may include a graphical representation of the desirable vehicle, system, and component performance characteristics and the corresponding test data points.

In block 422, the diagnostic processor may control an output device to output the analysis of the diagnosis.

Figure 5:
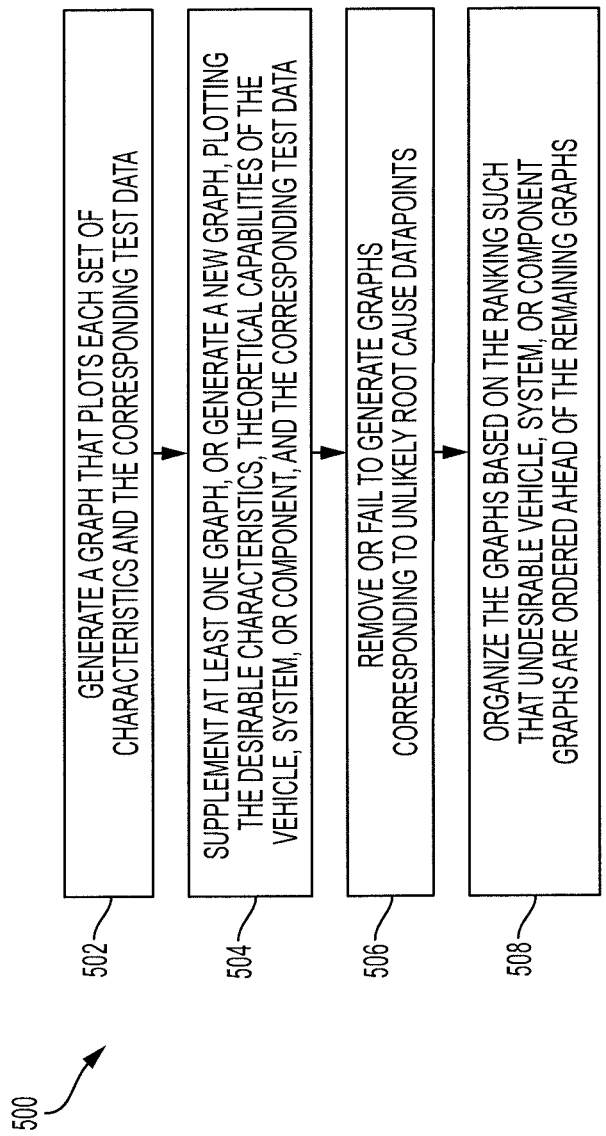
FIG. 5 is a flowchart illustrating a method for generating an analysis of the undesirable behavior identified using the method of FIG. 4 according to an embodiment of the present invention.

Referring now to FIG. 5, a method 500 for generating an analysis of a diagnosis of a vehicle is shown. In block 502, the diagnostic processor may generate a plurality of graphs. Each graph may be associated with a desirable vehicle, system, or component performance characteristic. For example, a first graph may correspond to a desirable acceleration of the vehicle, a second graph may correspond to a desirable output of a motor generator of the vehicle, and a third graph may correspond to a desirable SOC of a battery of the vehicle.

Each graph may further include the corresponding data points from the test data. For example, the first graph may further include data points corresponding to detected acceleration of the vehicle during a test run of the vehicle (or a simulation of a model of the vehicle). The second graph may further include data points corresponding to detected power output of the motor generator during the test run. The third graph may further include data points corresponding to a detected SOC of the battery during the test run.

In block 504, the diagnostic processor may supplement at least one of the graphs generated in block 502 with theoretical capabilities of the corresponding vehicle, system, or component. In that regard, the at least one graph may include the desirable performance characteristics, the test data, and the theoretical capabilities. Such a graph may illustrate whether the desirable performance characteristics are theoretically possible, and how far the test data points are from the desirable performance characteristics and the theoretical capabilities. For example, a graph may illustrate desirable power output of a motor generator for various situations, the power output of the motor generator that is theoretically capable for the various situations, and the data points collected from the test data that corresponds to the power output of the motor generator.

A designer may utilize the comparison of the test data points to the theoretical capabilities to optimize control of the vehicle, system, or component. For example, if the data points are significantly less in value than the theoretical capabilities in a certain area then control may be optimized by increasing the control target in the area of the data points.

In block 506, the diagnostic processor may remove or fail to generate graphs corresponding to the unlikely root cause data points. The diagnostic processor may do so because the unlikely root cause data points are unlikely to be the root cause of the undesirable vehicle performance data points. In some embodiments, the diagnostic processor may cause the graphs corresponding to the unlikely root cause data points to remain in the analysis.

In block 508, the diagnostic processor may organize the graphs based on the ranking of the undesirable data points. For example, the diagnostic processor may organize the graphs such that a graph corresponding to the highest ranked undesirable data point is provided first, a graph corresponding to the second highest ranked undesirable data point is provided second, and so forth. In some embodiments, the diagnostic processor may organize the graphs such that the graph corresponding to the highest undesirable component data point is provided first, the graph corresponding to the system associated with the highest undesirable component data point is provided second, and so forth. In some embodiments, the diagnostic processor may organize the graphs such that all component graphs are provided first, all system graphs are provided second, and so forth. In some embodiments, the diagnostic processor may organize the graphs such that all vehicle graphs are provided first, all system graphs are provided second, and so forth.

Figure 6A:
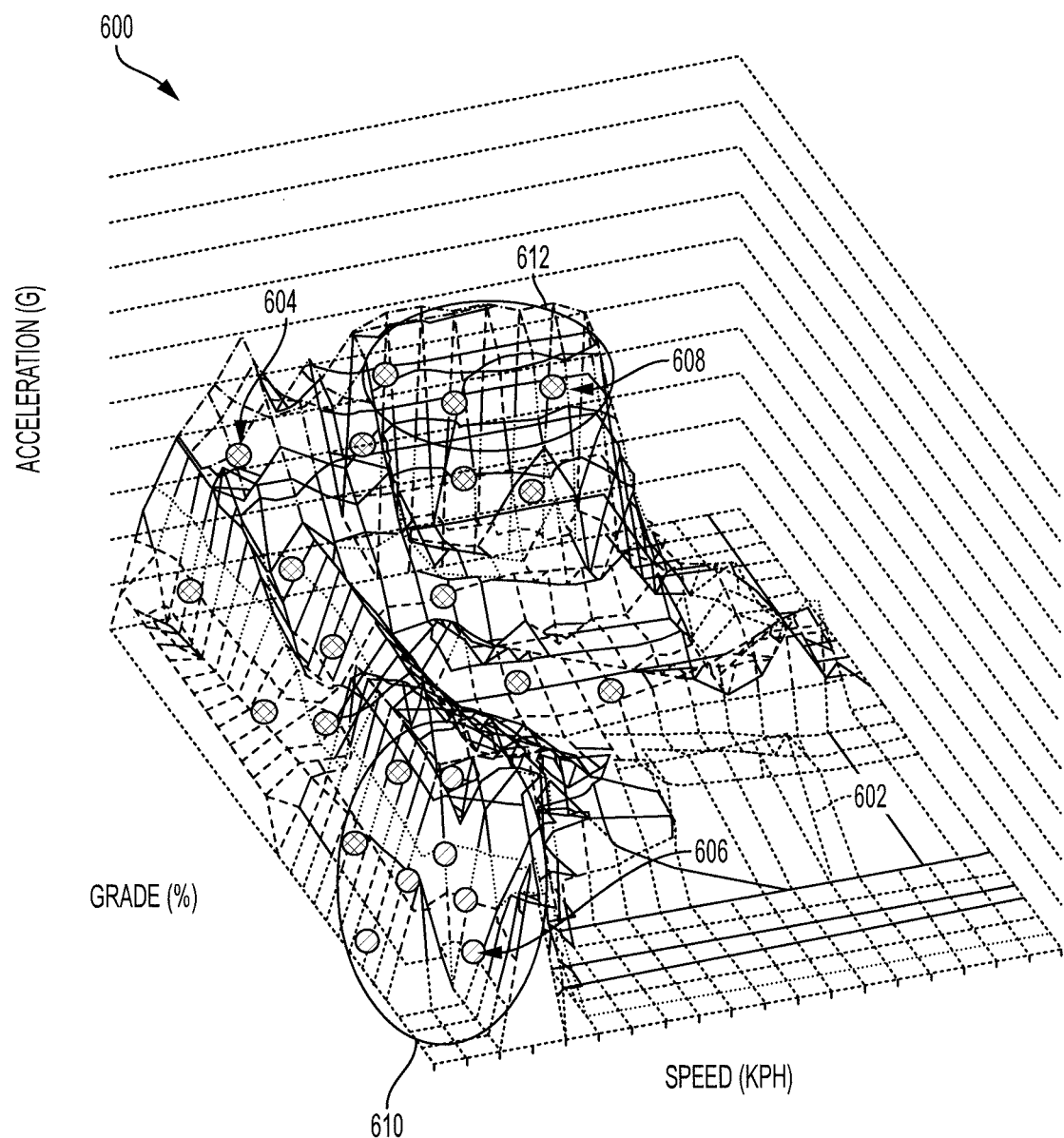
FIG. 6A is a three-dimensional graph illustrating desirable vehicle performance characteristics of a vehicle along with detected vehicle data used to identify undesirable vehicle performance according to an embodiment of the present invention.

Turning to FIG. 6A, an exemplary analysis generated by a diagnostic processor, such as the diagnostic processor 110 of FIG. 1, is shown. The diagnostic processor may be performing methods similar to the method 300 of FIG. 3 and the method 400 of FIG. 4. The diagnostic processor may have already received desirable vehicle, system, and component performance characteristics as well as test data from a vehicle, a dynamometer, or a model of the vehicle.

The diagnostic processor has identified undesirable vehicle performance data points by comparing the desirable performance characteristics and the test data. A 3D graph 600 illustrates results of the comparison. As shown, the graph 600 includes a mesh 602 that represents the desirable vehicle performance characteristics of the vehicle. The graph 600 further includes a plurality of points 604 that represent the detected vehicle test data. This mesh 602 and points 604 are plotted relative to a corresponding road grade, vehicle speed, and acceleration of the vehicle. As shown, the plurality of points 604 include undesirable vehicle performance data points 606 along with desirable vehicle performance data points 608.

The graph 600 illustrates an area of undesirable results 610 that includes the undesirable vehicle performance data points 606. The graph 600 further illustrates an area with a design buffer 612 (i.e., an area in which the test data exceeds the undesirable vehicle performance characteristics).

Figure 6B:
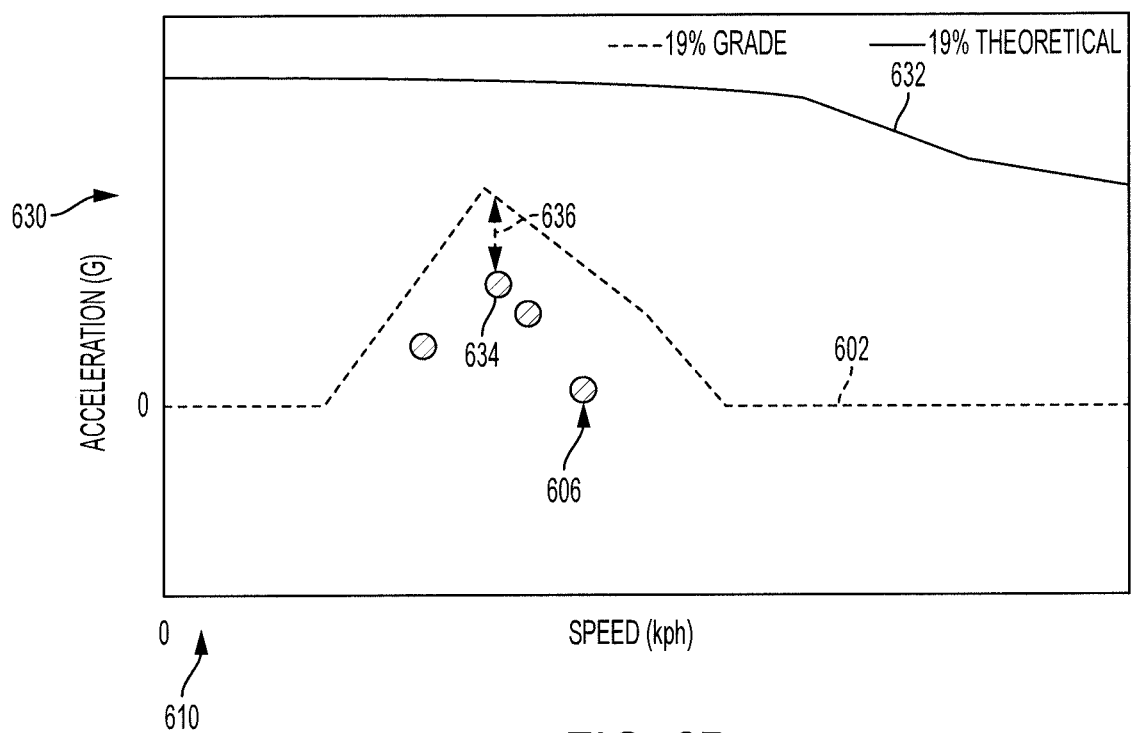
FIG. 6B is a two-dimensional graph illustrating the desirable vehicle performance characteristics of FIG. 6A along with undesirable vehicle performance data points and theoretical capabilities of the vehicle according to an embodiment of the present invention.
Figure 6C:
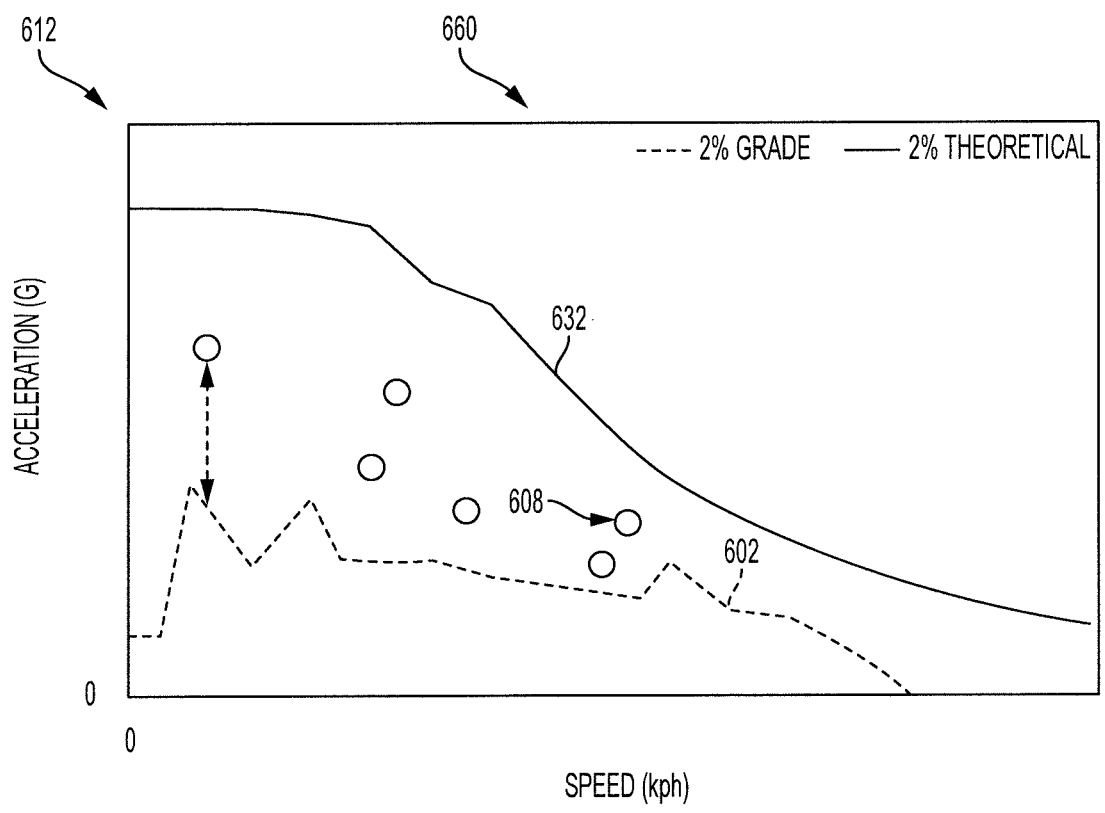
FIG. 6C is a two-dimensional graph illustrating the desirable vehicle performance characteristics of FIG. 6A along with desirable vehicle performance data points and theoretical capabilities of the vehicle according to an embodiment of the present invention.

Referring to FIGS. 6A, 6B, and 6C, a first two-dimensional graph 630 illustrates the area of undesirable results 610 and a second two-dimensional graph 660 illustrates the area with the design buffer 612. The first two-dimensional graph 630 includes axes for the vehicle speed and the vehicle acceleration, and the entire graph 630 corresponds to a 19% grade.

The first two-dimensional graph 630 plots the desirable vehicle performance characteristics 602, the undesirable vehicle performance data points 606, and theoretical capabilities 632 of the vehicle. As shown, the undesirable vehicle performance data points 606 are below the desirable vehicle performance characteristics 602, thus illustrating that the data points 606 are undesirable. In particular, a first data point 634 is a distance 636 below the desired vehicle performance characteristics 602 (corresponding to an acceleration gap of 0.08 G). In order for the data point 634 to no longer be considered undesirable, the data point 634 should increase by 0.08 G to reach approximately 0.18 G of acceleration.

As further shown, the desirable vehicle performance characteristics 602 are below the theoretical capabilities 632 of the vehicle. This illustrates that the desirable vehicle performance characteristics 602 are reasonable expectations and thus the undesirable results are caused by issues other than unreasonable expectations of the vehicle.

The second two-dimensional graph 660 illustrates the desirable vehicle performance characteristics 602, the desirable vehicle performance data points 608, and the theoretical capabilities 632 of the vehicle. As shown, the desirable vehicle performance data points 608 are located above the desirable vehicle performance characteristics 602. Thus, the desirable vehicle performance data points 608 exceed the desirable vehicle performance characteristics 602. In particular, the desirable vehicle performance data points 608 may be considered to have a design buffer because the corresponding accelerations may be reduced while still being located at or above the desirable vehicle performance characteristics 602.

After identifying the undesirable vehicle performance data points, the diagnostic processor may analyze the test data in light of the desirable system performance characteristics to identify undesirable system data points. In some embodiments, the diagnostic processor may perform this analysis for each system of the vehicle. In some embodiments, the diagnostic processor may perform this analysis only for systems of the vehicle that can potentially cause the undesirable vehicle performance data points (i.e., in this example systems that can affect acceleration).

Figure 7A:
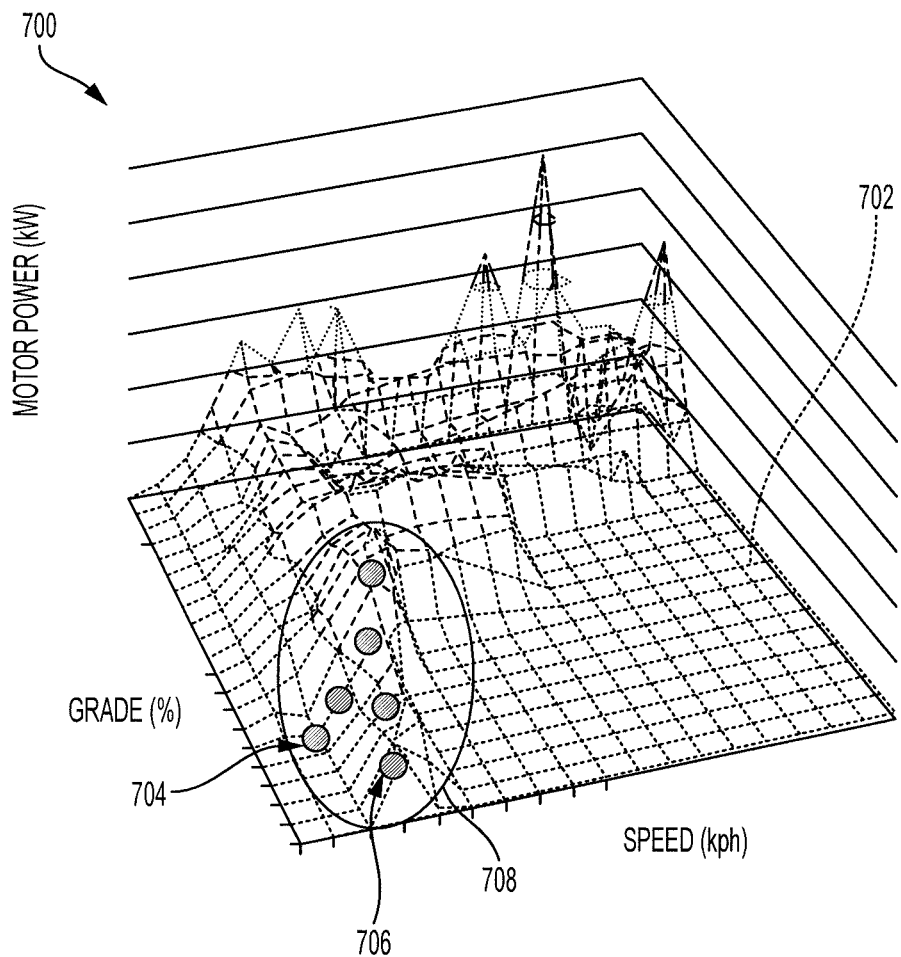
FIG. 7A is a three-dimensional graph illustrating desirable system performance characteristics of a motor system of the vehicle of FIG. 6A along with detected system data used to identify undesirable system performance according to an embodiment of the present invention.

For example and referring to FIG. 7A, a three-dimensional graph 700 illustrates desirable system performance characteristics 702 for a motor system of the vehicle, along with corresponding detected system data 704. The diagnostic processor may identify undesirable system data points 706 by comparing the desirable system performance characteristics 702 and the detected system data 704. In particular, the diagnostic processor may identify the undesirable system data points 706 as any data points that are located below the desirable system performance characteristics 702. As shown, the graph 700 illustrates an area of undesirable results 708 that includes the undesirable system data points 706.

Figure 7B:
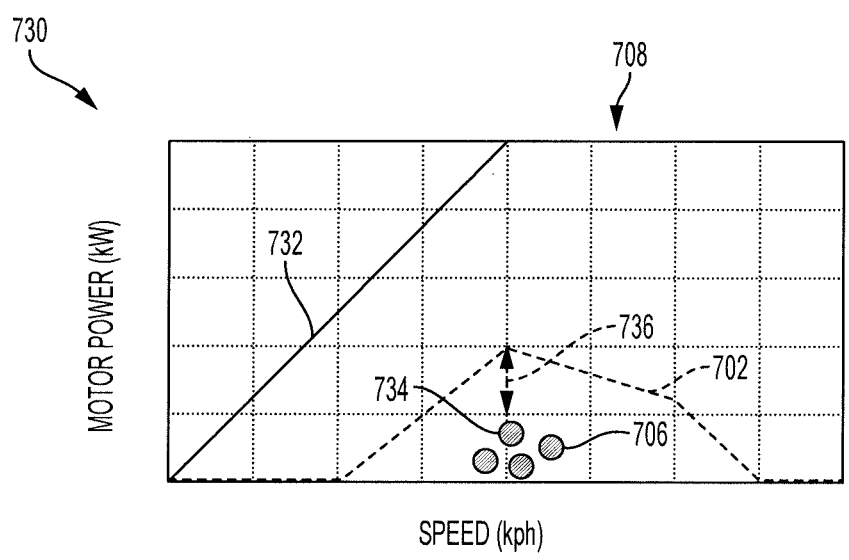
FIG. 7B is a two-dimensional graph illustrating the desirable system performance characteristics of FIG. 7A along with undesirable system performance data points and theoretical capabilities of the motor system according to an embodiment of the present invention.
Figure 7C:
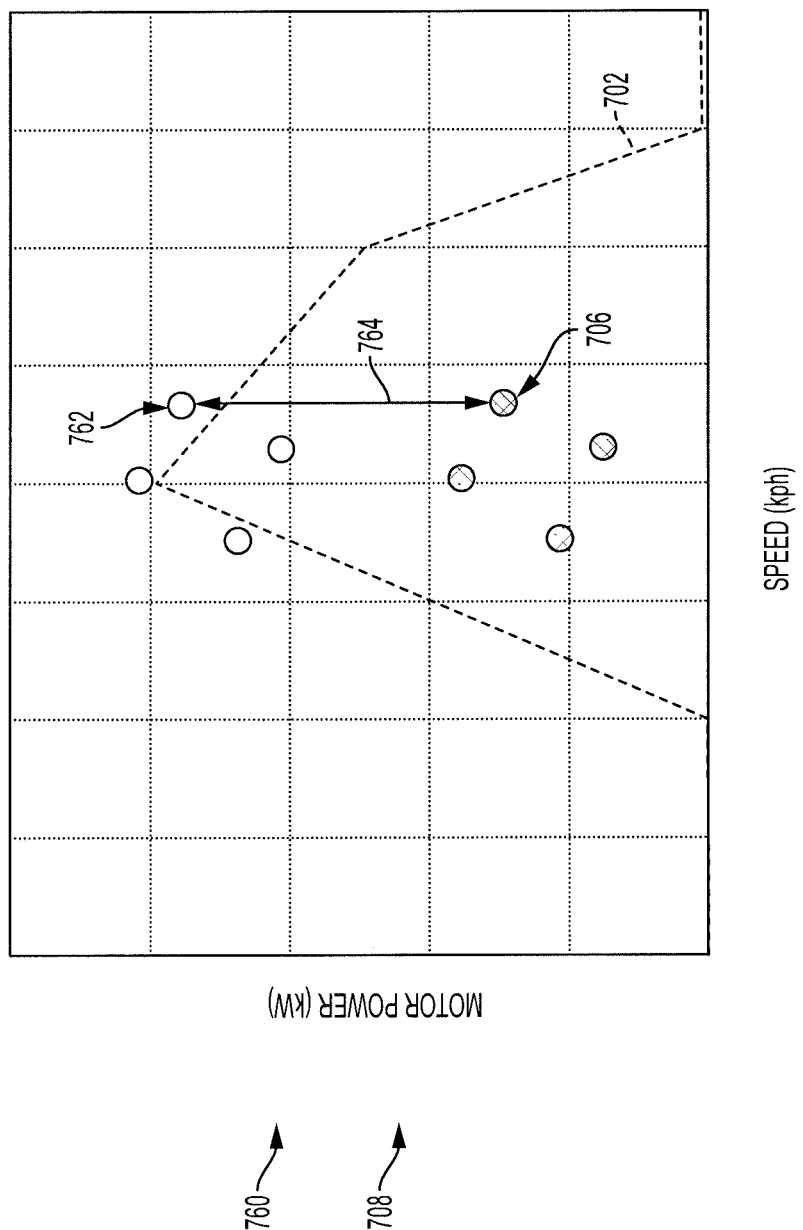
FIG. 7C is a two-dimensional graph illustrating the desirable system performance characteristics of FIG. 7A along with the undesirable system performance data points of FIG. 7B and target system performance as determined by a controller of the motor system according to an embodiment of the present invention.

Referring now to FIGS. 7A, 7B, and 7C, a first two-dimensional graph 730 illustrates the desirable system performance characteristics 702, the undesirable system data points 706, and theoretical capabilities 732 of the motor system for a road grade of approximately 18% and for the area of undesirable results 708. As shown, the undesirable system data points 706 are located below the desirable system performance characteristics 702 by at least a distance 736. In that regard, the motor system is outputting approximately 12 kW of power below the desired power output for the given road grade and speeds. The desirable system performance characteristics 702 are located below the theoretical capabilities 732, thus indicating that the desirable system performance characteristics 702 are reasonably selected.

A second two-dimensional graph 760 illustrates the desirable system performance characteristics 702, the undesirable system data points 706, and targets 762 corresponding to target motor power as chosen by an ECU of the vehicle for the given road grade (18%) and speeds. As shown, the undesirable system data points 706 are located below the targets 762 by a distance 764 corresponding to approximately 12 kW.

The diagnostic processor may compare the undesirable system data points 706 to the targets 762 to identify whether the undesirable system data points 706 are unlikely root cause data points. In particular, if the undesirable system data points 706 are equal to or greater than the targets 762 then the diagnostic processor may identify the undesirable system data points 706 as unlikely root cause data points. This is because a low target may indicate that the undesirable system data points 706 are caused by either operator error or undesirable motor control by the ECU as opposed to a hardware error.

After identifying the undesirable system data points, the diagnostic processor may analyze the test data in light of the desirable component performance characteristics to identify undesirable component data points. In some embodiments, the diagnostic processor may perform this analysis for each component of the corresponding system or each component of the vehicle. In some embodiments, the diagnostic processor may perform this analysis only for components of the system that may potentially cause the undesirable system data points (i.e., in this example, components that can affect motor power output).

Figure 8:
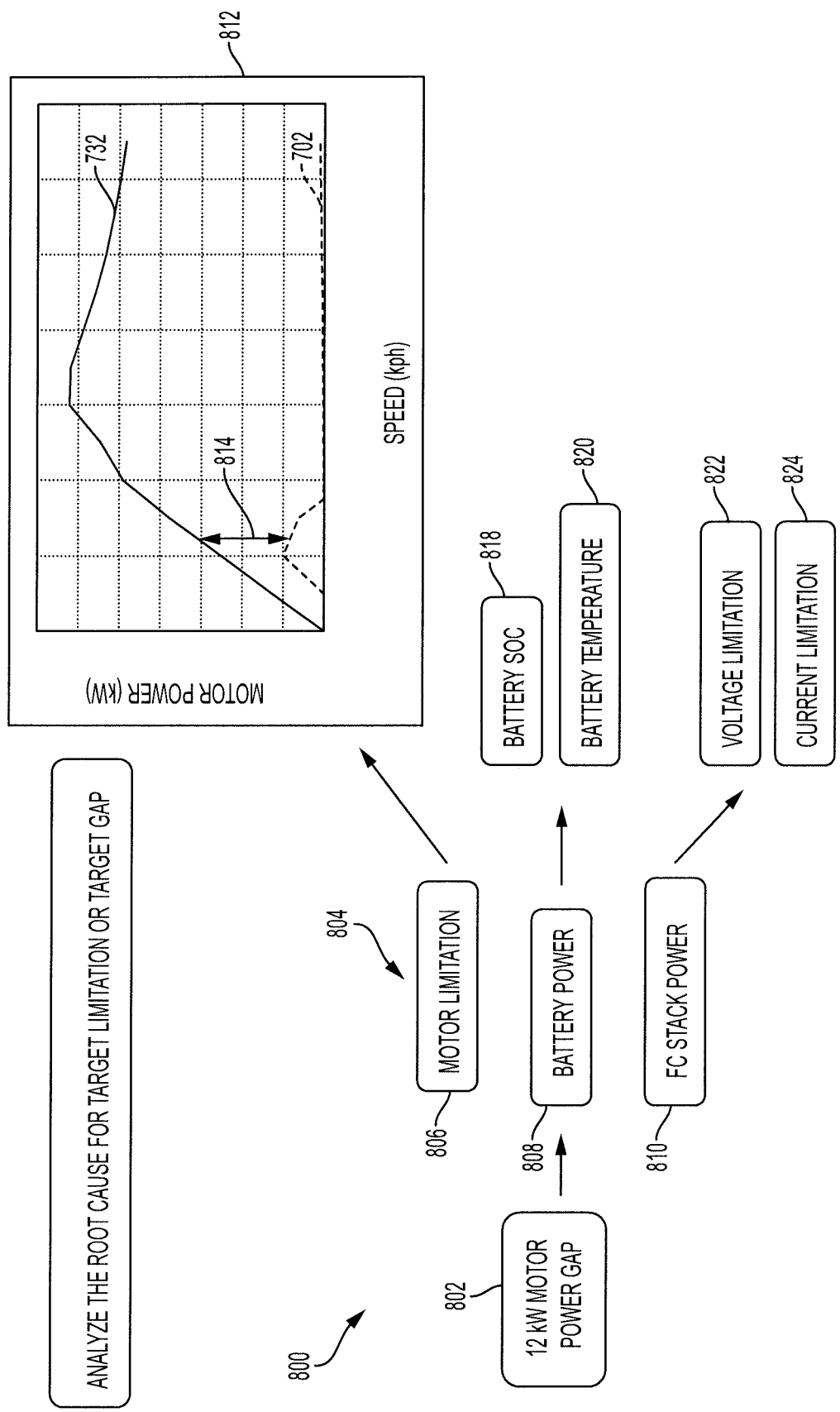
FIG. 8 is a system diagram illustrating various components used in the motor system of FIG. 7A that may be the cause of the undesirable system performance according to an embodiment of the present invention.

In particular and referring to FIG. 8, a system diagram 800 illustrates how the diagnostic processor may analyze component behavior of the motor system. In particular, the diagnostic processor has learned that the motor system is outputting about 12 kW below the target motor power and, thus, the 12 kW motor power data indicates an undesirable system performance 802. The motor system may include multiple components or subsystems 804 including a motor limitation component 806, a battery power component 808, and a fuel cell stack component 810.

The diagnostic processor may analyze each of the components or subsystems 804 to identify undesirable components data points. First, the diagnostic processor may analyze the motor limitation component 806 by comparing the desirable system performance characteristics 702 with the theoretical capabilities 732 of the motor. Results of the analysis are illustrated in a graph 812. As shown, a design margin 814 exists between the desirable system performance characteristics 702 and the theoretical capabilities 732, thus indicating that the undesirable system performance 802 is not caused by the motor limitation component 806.

The battery power component 808 and the fuel cell stack power component 810 may each include multiple subcomponents (which may also be referred to as components). In particular, the battery power component 808 includes a battery state of charge 818 and a battery temperature 820 which may each affect the battery power component 808. The fuel cell stack power component 810 may include a voltage limitation 822 and a current limitation 824 which may each affect the fuel cell stack power component 810.

Figure 9A:
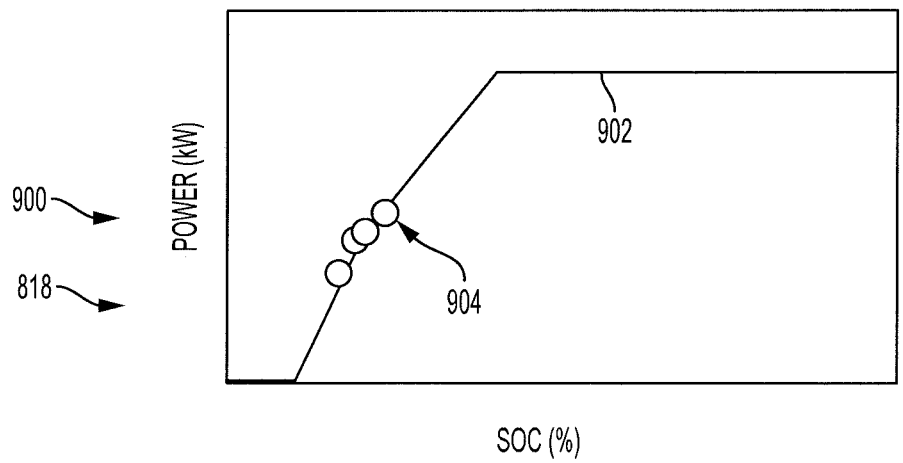
FIGS. 9A and 9B are two-dimensional graphs illustrating desirable component performance characteristics of a battery of the motor system of FIG. 7A including a battery state of charge and a battery temperature along with corresponding test data according to an embodiment of the present invention.
Figure 9B:
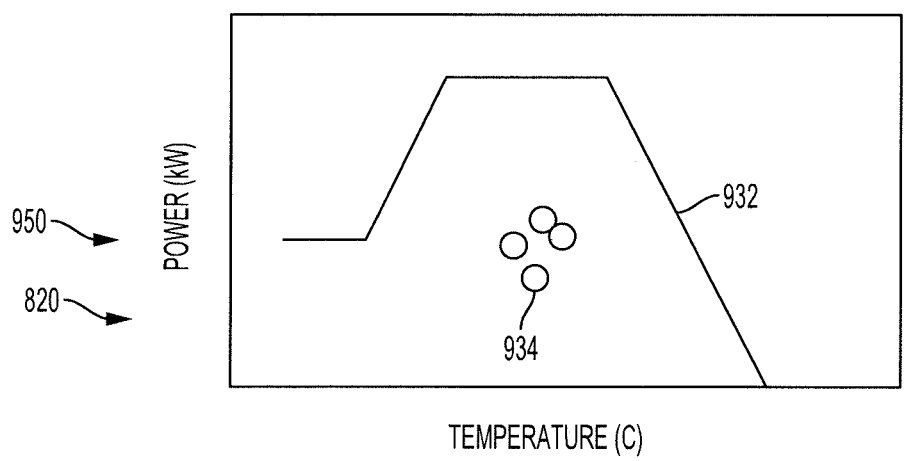

Referring to FIGS. 9A and 9B, a first graph 900 illustrates the battery state of charge 818, and a second graph 950 illustrates the battery temperature 820. The first graph 900 illustrates desirable component performance characteristics 902 for a state of charge and a power output of the battery. The desirable component performance characteristics 902 are illustrated as performance limitations. A performance limitation corresponds to a maximum value such that it is desirable for data points to be located below the maximum value.

A plurality of data points 904 correspond to undesirable component data points because they are located on or above the desirable component performance characteristics 902 (which are performance limitations). In particular, the first graph 900 illustrates that the battery output may be limited by the state of charge of the battery being relatively low, which may be due to issues other than hardware failure. For example, the battery SOC may have been drained during a previous driving portion such that the SOC has not increased above the desired SOC level (i.e., the performance limitation).

The second graph 950 plots desirable component performance characteristics 932 for a battery temperature and a battery power. Again, the desirable component performance characteristics 932 may correspond to performance limitations such that it is desirable for all data points to be located at or below the design component performance characteristics 932. In that regard, the diagnostic processor may learn or otherwise be aware of which performance characteristics correspond to performance limitations.

The second graph 950 illustrates a plurality of data points 934. Because the data points 934 are located below the desirable component performance characteristics 932, the data points 934 may be referred to as desirable component data points. Thus, the second graph 950 illustrates that battery temperature is unlikely to be a cause of the low motor power output.

Figure 10A:
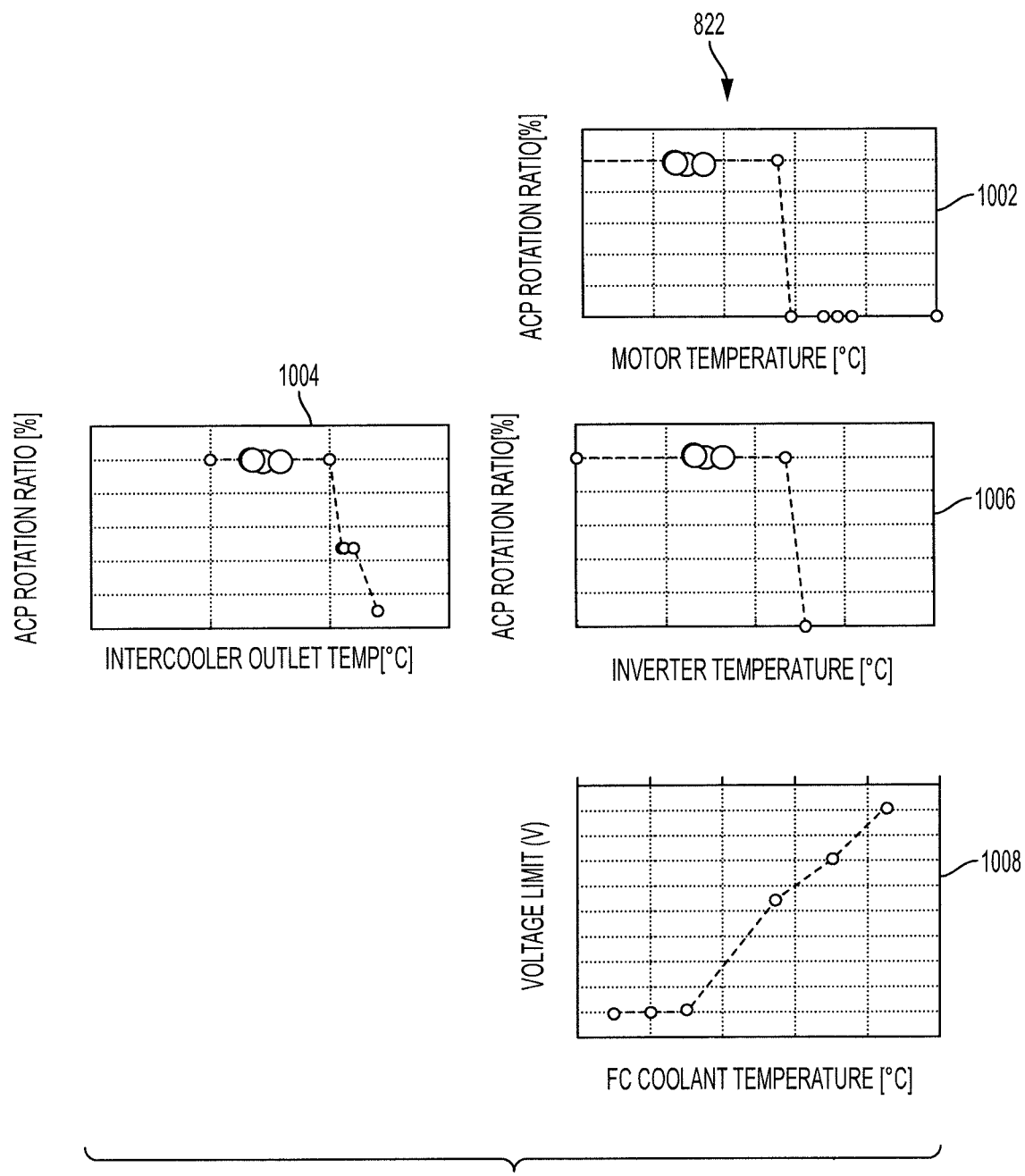
FIGS. 10A and 10B include two-dimensional graphs illustrating desirable component performance characteristics of a voltage limitation and a current limitation of a fuel cell stack according to an embodiment of the present invention.

Referring to FIG. 10A, the diagnostic processor may analyze the voltage limitation component 822 corresponding to a voltage limitation of a fuel cell stack of the vehicle. In particular, the diagnostic processor may analyze various aspects of the voltage limitation component 822. Various aspects may affect the voltage limitation component 822 and may be analyzed by the diagnostic processor. The diagnostic processor may output graphs illustrating desirable component performance characteristics and corresponding component data points for each of these aspects.

In particular, a first graph 1002 plots desirable component performance characteristics and corresponding component data points for a motor temperature of the fuel cell stack and a rotation ratio. A second graph 1004 plots desirable component performance characteristics and corresponding component data points for an intercooler outlet temperature and a rotation ratio of the fuel cell stack. A third graph 1006 plots desirable component performance characteristics and corresponding component data points for an inverter temperature and a rotation ratio of the fuel cell stack. A fourth graph plots desirable component performance characteristics and corresponding component data points for a fuel cell coolant temperature and a voltage limit of the fuel cell. Each of the desirable component performance characteristics illustrated in the graphs 1002, 1004, 1006, 1008 correspond to targets and not limitations. Thus, because each of the component data points is located at or above the corresponding desirable component performance characteristics, it can be inferred that the voltage limitation component 822 is unlikely to be a cause of the undesirable motor performance.

Figure 10B:
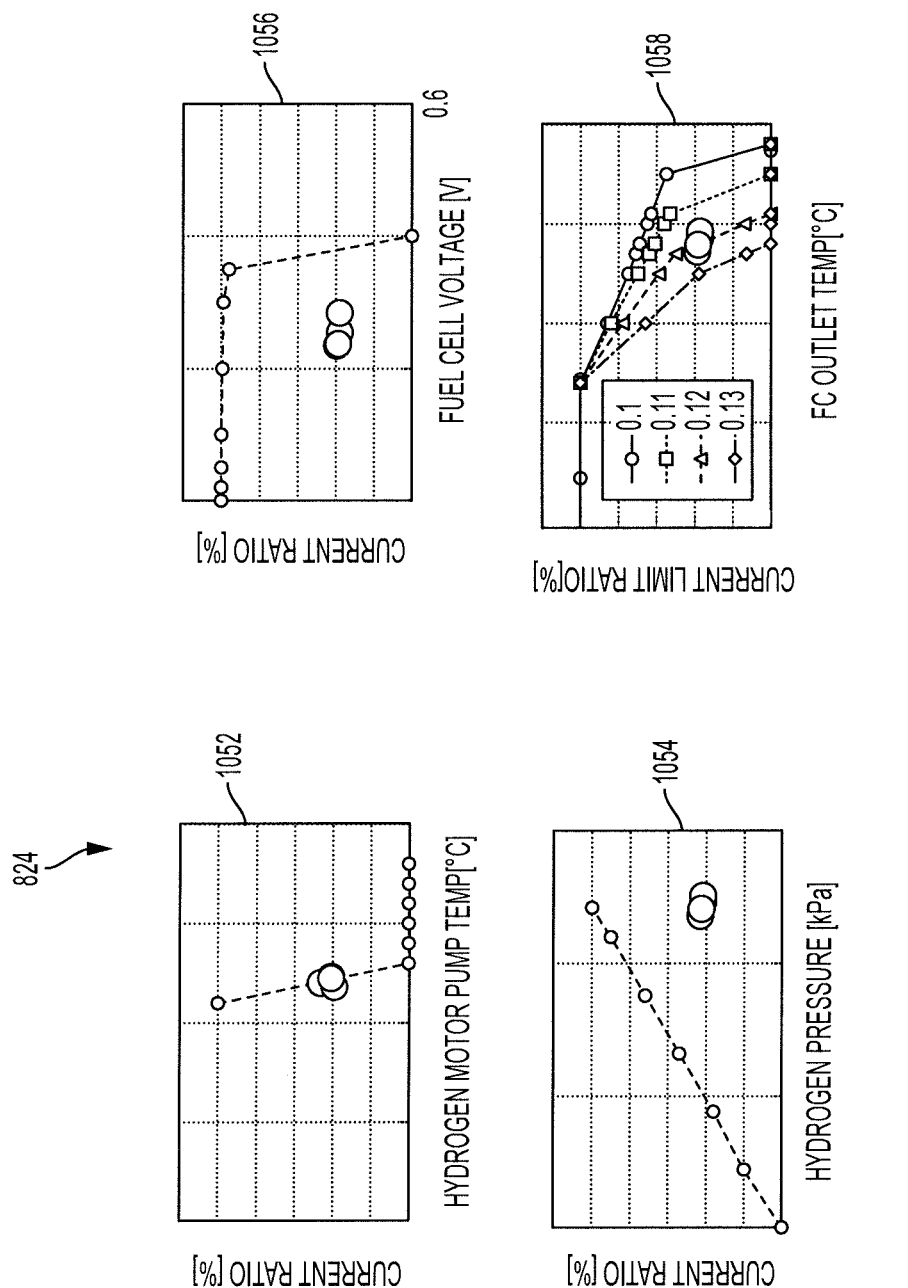

Referring now to FIG. 10B, the diagnostic processor may analyze the current limitation component 824 corresponding to a current limitation of a fuel cell stack of the vehicle. In particular, the diagnostic processor may analyze various aspects of the current limitation component 824. The various aspects may affect the current limitation component 824 and may thus be analyzed by the diagnostic processor. The diagnostic processor may output graphs illustrating desirable component performance characteristics and corresponding component data points for each of these aspects.

In particular, a first graph 1052 plots desirable component performance characteristics and corresponding component data points for a hydrogen motor pump temperature and a current ratio of the fuel cell stack. A second graph 1054 plots desirable component performance characteristics and corresponding component data points for a hydrogen pressure and a current ratio of the fuel cell stack. A third graph 1056 plots desirable component performance characteristics and corresponding component data points for a fuel cell voltage and a current ratio of the fuel cell stack. A fourth graph 1058 plots desirable component performance characteristics and corresponding component data points for a fuel cell temperature and a current limit ratio of the fuel cell stack.

Each of the desirable component performance characteristics illustrated in the graphs 1052, 1054, and 1056 correspond to performance limitations rather than targets. The fourth graph 1058 corresponds to a target. In that regard, it can be seen from the first graph 1052 that the hydrogen motor pump temperature has reached the performance limitation and is thus an undesirable component data point.

Accordingly, an engineer viewing the graphs generated by the diagnostic processor and illustrated in FIGS. 6A through 10B may first identify that the vehicle acceleration is undesirable at a given road grade and speed. The engineer may further identify that the motor power output is a potential cause of the undesirable vehicle acceleration, and may identify that the hydrogen motor pump temperature is a potential cause of the undesirable motor power output. Thus, the analysis generated by the diagnostic processor may be used to review undesirable vehicle performance and identify likely causes of the undesirable vehicle performance. In some embodiments, the diagnostic processor is able to identify, without human interaction, that the vehicle acceleration is undesirable at a given road grade and speed.

Where used throughout the specification and the claims, "at least one of A or B" includes "A" only, "B" only, or "A and B." Exemplary embodiments of the methods/systems have been disclosed in an illustrative style. Accordingly, the terminology employed throughout should be read in a non-limiting manner. Although minor modifications to the teachings herein will occur to those well versed in the art, it shall be understood that what is intended to be circumscribed within the scope of the patent warranted hereon are all such embodiments that reasonably fall within the scope of the advancement to the art hereby contributed, and that that scope shall not be restricted, except in light of the appended claims and their equivalents.

What is claimed is:

1. A diagnostic system for diagnosing a vehicle or a vehicle model, comprising:
an input device configured to receive user input including desirable vehicle performance characteristics of the vehicle corresponding to target operation of vehicle performance, desirable system performance characteristics of systems of the vehicle corresponding to target operation of the systems, and desirable component performance characteristics corresponding to target operation of components of the systems;
an output device configured to output data; and
a diagnostic processor coupled to the input device and the output device and configured to:
receive test data corresponding to a simulation of the vehicle or a performance test of the vehicle and including detected vehicle data, detected system data, and detected component data,
determine undesirable vehicle performance data points that correspond to vehicle performance that falls below the target operation of the vehicle performance by comparing the desirable vehicle performance characteristics to the detected vehicle data,
determine undesirable system data points that correspond to likely causes of the undesirable vehicle performance data points by comparing the desirable system performance characteristics to the detected system data, the undesirable system data points corresponding to system performance that falls below the target operation of the systems,
determine undesirable component data points that correspond to likely causes of the undesirable system data points by comparing the desirable component performance characteristics to the detected component data, the undesirable component data points corresponding to component performance that falls below the target operation of the components,
generate an analysis of the undesirable component data points including selected component data points of the undesirable component data points that are likely causes of the undesirable vehicle performance data points,
identify unlikely root cause data points corresponding to at least one of the undesirable component data points that was caused by operator error or an incorrectly-set desirable component characteristic,
prioritize remaining undesirable component data points over the unlikely root cause data points in the analysis, and
control the output device to output the analysis of the undesirable component data points.

2. The diagnostic system of claim 1 wherein the diagnostic processor is further configured to identify a most likely undesirable component data point corresponding to a most likely root cause of one of the undesirable vehicle performance data points by eliminating the unlikely root cause data points and selecting a first undesirable component data point from the remaining undesirable component data points that is farthest from the desirable component performance characteristics.

3. The diagnostic system of claim 1 wherein the diagnostic processor is further configured to identify the unlikely root cause data points as the at least one of the undesirable component data points that is equal to or greater than a corresponding value of the desirable component performance characteristics.

4. The diagnostic system of claim 1 wherein the analysis of the undesirable component data points includes at least one vehicle graph plotting the desirable vehicle performance characteristics to the detected vehicle data, at least one system graph plotting the desirable system performance characteristics to the detected system data, and at least one component graph plotting the desirable component performance characteristics to the detected component data.

5. The diagnostic system of claim 4 wherein the analysis of the undesirable component data points begins with a first vehicle graph of the at least one vehicle graph that corresponds to the undesirable vehicle performance data points, a first system graph of the at least one system graph that corresponds to the undesirable system data points, or a first component graph of the at least one component graph that corresponds to the undesirable component data points.

6. The diagnostic system of claim 4 wherein the at least one vehicle graph includes a three-dimensional graph having a three-dimensional mesh corresponding to the desirable vehicle performance characteristics and the detected vehicle data plotted relative to the three-dimensional mesh, such that the undesirable vehicle performance data points can be visually identified as data points that lie below the three-dimensional mesh.

7. The diagnostic system of claim 4 wherein the at least one system graph visually represents each of the desirable system performance characteristics, theoretical capabilities of the system in an ideal configuration, and the detected system data plotted relative to the desirable system performance characteristics and the theoretical capabilities of the system.

8. The diagnostic system of claim 1 wherein the diagnostic processor is configured to determine the undesirable system data points that correspond to the likely causes of only the undesirable vehicle performance data points, and to determine the undesirable component data points that correspond to the likely causes of only the undesirable system data points.

9. The diagnostic system of claim 1 wherein the diagnostic processor is further configured to receive the test data from an electronic control unit (ECU) of the vehicle or from a dynamometer configured to facilitate the performance test of the vehicle.

10. The diagnostic system of claim 1 wherein a first desirable component characteristic is provided as a target and a second desirable component characteristic is provided as a limitation and the diagnostic processor is further configured to determine that a first component data point is undesirable when the first component data point is less than the target of the first desirable component characteristic and that a second component data point is undesirable when the second component data point is greater than the limitation of the second desirable component characteristic.

11. A diagnostic system for diagnosing a vehicle or a vehicle model, comprising:
an input device configured to receive user input including desirable vehicle performance characteristics of the vehicle corresponding to target operation of vehicle performance, desirable system performance characteristics of systems of the vehicle corresponding to target operation of the systems, and desirable component performance characteristics corresponding to target operation of components of the systems;
a display configured to output data; and a diagnostic processor coupled to the input device and the display and configured to:
receive test data corresponding to a simulation of the vehicle or a performance test of the vehicle and including detected vehicle data, detected system data, and detected component data,
determine undesirable vehicle performance data points that correspond to vehicle performance that falls below the target operation of the vehicle performance by comparing the desirable vehicle performance characteristics to the detected vehicle data,
determine undesirable system data points that correspond to likely causes of the undesirable vehicle performance data points by comparing the desirable system performance characteristics to the detected system data, the undesirable system data points corresponding to system performance that falls below the target operation of the systems,
determine undesirable component data points that correspond to likely causes of the undesirable system data points by comparing the desirable component performance characteristics to the detected component data, the undesirable component data points corresponding to component performance that falls below the target operation of the components,
generate an analysis of the undesirable component data points including selected component data points of the undesirable component data points that are likely causes of the undesirable vehicle performance data points,
identify unlikely root cause data points corresponding to at least one of the undesirable component data points that was caused by operator error or an incorrectly-set desirable component characteristic,
prioritize remaining undesirable component data points over the unlikely root cause data points in the analysis, and
control the display to output the analysis of the undesirable component data points.

12. The diagnostic system of claim 11 wherein the diagnostic processor is further configured to identify a most likely undesirable component data point corresponding to a most likely root cause of one of the undesirable vehicle performance data points by eliminating the unlikely root cause data points and selecting a first undesirable component data point from the remaining undesirable component data points that is farthest from the desirable component performance characteristics.

13. The diagnostic system of claim 11 wherein the diagnostic processor is further configured to identify the unlikely root cause data points as the at least one of the undesirable component data points that is equal to or greater than a corresponding value of the desirable component performance characteristics.

14. The diagnostic system of claim 10 wherein:
the analysis of the undesirable component data points includes at least one vehicle graph plotting the desirable vehicle performance characteristics to the detected vehicle data, at least one system graph plotting the desirable system performance characteristics to the detected system data, and at least one component graph plotting the desirable component performance characteristics to the detected component data;
the analysis of the undesirable component data points begins with a first vehicle graph of the at least one vehicle graph that corresponds to the undesirable vehicle performance data points, a first system graph of the at least one system graph that corresponds to the undesirable system data points, or a first component graph of the at least one component graph that corresponds to the undesirable component data points; and
the at least one vehicle graph includes a three-dimensional graph having a three-dimensional mesh corresponding to the desirable vehicle performance characteristics and the detected vehicle data plotted relative to the three-dimensional mesh, such that the undesirable vehicle performance data points can be visually identified as data points that lie below the three-dimensional mesh.

15. A method for diagnosing a vehicle or a vehicle model comprising:
receiving, via an input device, user input including desirable vehicle performance characteristics of the vehicle corresponding to target operation of vehicle erformance desirable system performance characteristics of systems of the vehicle corresnonding to target operation of the systems, and desirable component performance characteristics corresponding to target operation of components of the systems;
receiving, by a diagnostic processor, test data corresponding to a simulation of the vehicle or a performance test of the vehicle and including detected vehicle data, detected system data, and detected component data;
determining, by the diagnostic processor, undesirable vehicle performance data points that correspond to vehicle performance that falls below the target operation of the vehicle performance by comparing the desirable vehicle performance characteristics to the detected vehicle data;
determining, by the diagnostic processor, undesirable system data points that correspond to likely causes of the undesirable vehicle performance data points by comparing the desirable system performance characteristics to the detected system data, the undesirable system data points corresponding to system performance that falls below the target operation of the systems;
determining, by the diagnostic processor, undesirable component data points that correspond to likely causes of the undesirable system data points by comparing the desirable component performance characteristics to the detected component data, the undesirable component data points corresponding to component performance that falls below the target operation of the components;
generating, by the diagnostic processor, an analysis of the undesirable component data points including selected component data points of the undesirable component data points that are likely causes of the undesirable vehicle performance data points;
determining, by the diagnostic processor, unlikely root cause data points corresponding to at least one of the undesirable component data points that was caused by operator error or an incorrectly-set desirable component characteristic;
prioritize remaining undesirable component data points over the unlikely root cause data points in the analysis; and
controlling, by the diagnostic processor, an output device to output the analysis of the undesirable component data points.

16. The method of claim 15 further comprising identifying, by the diagnostic processor, a most likely undesirable component data point corresponding to a most likely root cause of one of the undesirable vehicle performance data points by eliminating the unlikely root cause data points and selecting a first undesirable component data point from the remaining undesirable component data points that is farthest from the desirable component performance characteristics.

17. The method of claim 15 wherein identifying the unlikely root cause data points further includes identifying the unlikely root cause data points as the at least one of the undesirable component data points that is equal to or greater than a corresponding value of the desirable component performance characteristics.

* * * * *